No. 722,728. PATENTED MAR. 17, 1903.
H. V. LOSS.
DEVICE FOR ELECTRICALLY HEATING RIVETS.
APPLICATION FILED MAR. 5, 1901.
NO MODEL.
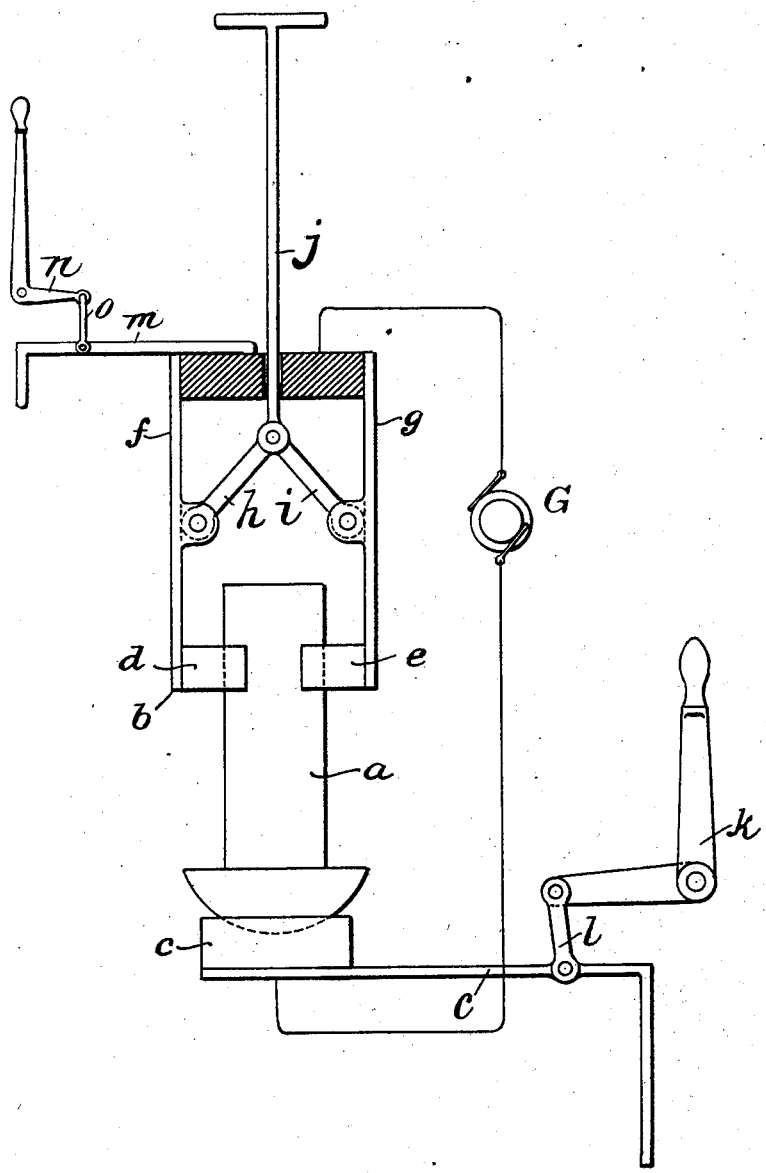

UNITED STATES PATENT OFFICE.

HENRIK V. LOSS, OF PHILADELPHIA, PENNSYLVANIA, ASSIGNOR TO WESTINGHOUSE ELECTRIC & MANUFACTURING COMPANY, A CORPORATION OF PENNSYLVANIA.

DEVICE FOR ELECTRICALLY HEATING RIVETS.

SPECIFICATION forming part of Letters Patent No. 722,728, dated March 17, 1903.

Application filed March 5, 1901. Serial No. 49,792. (No model.)

*To all whom it may concern:*

Be it known that I, HENRIK V. LOSS, a citizen of the United States, and a resident of the city and county of Philadelphia, State of Pennsylvania, have invented certain new and useful Improvements in Devices for Electrically Heating Rivets, of which the following is a specification.

My invention relates to improvements in devices for electrically heating rivets; and the object of my invention is to furnish an apparatus whereby rivets of any length or diameter may be quickly and effectually electrically heated.

The accompanying drawing shows a diagrammatic view of my apparatus for heating rivets, from which its action will be fully understood.

In a method and machine for electrically heating rivets there are two vitally essential points that must be provided for—first, the rivet must be so heated that when driven it will upset and completely fill the hole in which it is placed; second, the machine in order to be economical and generally useful must be adapted to heat rivets of widely-different lengths and diameters.

In order to fill the first essential, the point of the rivet—*i.e.*, that part opposite the head—should be heated to a considerably less degree than the main portion of the shank in order that when pressure or blows are applied to it the shank portion will be first upset to completely fill the hole in which it is placed; the upsetting of the end to form a head following the upsetting of that part of the rivet which is within the hole and which has been more highly heated, thus insuring the complete filling of the hole, which may not be effected if the head be first partially or completely formed.

In order that I may heat rivets of different lengths and diameters in the same apparatus, I resort to a device essentially similar to that shown in the drawing, in which $a$ is a rivet, $b$ a clamp, forming or connected with one pole of the battery or dynamo G, and $c$ a spring, forming or connected with the other pole of the battery. The clamp $b$, which engages the shank of the rivet $a$, is made, preferably, in two or more sections $d$ and $e$, which are preferably carried by springs or flexible supports $f\,g$, which may or may not be the electrical conductors. The sections of the clamp $b$ are adapted to engage the shank of the rivet, and by means of the springs $f\,g$, the links $h\,i$, pivotally secured at one end, one to spring $f$, the other to spring $g$, and at their other ends to one end of a bar $j$, and the bar $j$ or other suitable means the sections $d\,e$ may be moved toward or away from one another, as may be required, to permit the introduction between them of rivets of small or great diameter. The rivet at or near its head is carried by or connected to one of the poles of the battery or dynamo G during the heating, the pole preferably forming part of or being carried by a spring or flexible support $c$ or its equivalent, which by means of a bell-crank $k$, pivoted to a fixed support, and a connecting-link $l$, connecting the bell-crank and spring or other suitable means, may be moved toward or away from the clamp $b$, as may be required for rivets of different lengths.

If desired, the clamp-carrying means may be carried on a spring $m$ or other flexible support similar to the support $c$, and this spring $m$ and its connected parts may be moved toward or away from the seat by means of a bell-crank $n$ and a connecting-link $o$ or by any other suitable means. The seat and clamp may be either one or both spring-carried. This spring or flexible support may or may not form the electrical conductor.

In operating the device the shank of the rivet is grasped by the clamp $b$ at some little distance below its point, as shown in the drawing, the rivet at or near its head resting against the support $c$. The current now being turned on passes from clamp $b$ through the rivet to support $c$, heating that part of the rivet through which it passes highly, but leaving the point or points through which it does not pass comparatively cool. The heating of the rivets may be done in place—that is, in the holes which they are to close or it may be done before they are put into place.

In application bearing even date herewith,

Serial No. 49,791, I have claimed the method of heating rivets herein described.

Having thus described my invention, I claim as new and desire to secure by Letters Patent—

1. In a device for electrically heating rivets, in combination, a sectional clamp, the sections of which are mounted on flexible supports so that they may be moved toward or away from one another, adapted to engage the shank of the rivet, an engaging piece or seat adapted to engage the rivet at or near its head, said clamp and seat forming or being connected one to one pole and the other to the other pole of the source of electrical energy, and a flexible support for one of the contact devices so that it may be moved toward or away from the other.

2. In a device for electrically heating rivets, in combination, a sectional clamp adapted to engage the shank of the rivet, flexible supports for carrying the sections of said clamp, a seat adapted to engage the rivet at or near its head said clamp and seat being connected to or forming the poles of the source of electrical energy, flexible means for carrying one of the contact devices so that it may be moved toward or away from the other, and means for opening or closing said sectional clamp.

3. A heating apparatus comprising a source of electrical energy, relatively-movable contact-terminals, flexible conducting-supports therefor and means for actuating one or both of said contact-terminals to clamp the object to be heated between them, substantially as described.

4. A heating apparatus comprising a source of electrical energy, a two-part clamping-terminal having a flexible support, a coöperating single terminal having a flexible support and means for moving said single terminal into and out of engagement with the object to be heated.

5. A rivet-heating apparatus comprising a source of electrical energy, a two-part clamping-terminal having a flexible support, a single terminal having a flexible support and means for separating said terminals for the insertion of a rivet, and for forcing them toward each other to clamp the rivet in position to be heated.

6. In a rivet-heating apparatus, the combination with a source of electrical energy, of a two-part terminal and a single terminal for engaging a rivet, flexible supports for the terminals, and one or more levers for manipulating the terminals to clamp and release the rivet.

HENRIK V. LOSS.

Witnesses:
CHARLES A. RUTTER,
J. CRAIG SHIELDS.